United States Patent
Seo

(10) Patent No.: US 7,172,129 B2
(45) Date of Patent: Feb. 6, 2007

(54) INTEGRATED CIRCUIT CARD CAPABLE OF AUTOMATICALLY TRANSMITTING NULL BYTE INFORMATION WITHOUT INTERVENTION BY CPU

(75) Inventor: Kyung-Duck Seo, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 237 days.

(21) Appl. No.: 10/915,918

(22) Filed: Aug. 11, 2004

(65) Prior Publication Data

US 2005/0077363 A1    Apr. 14, 2005

(30) Foreign Application Priority Data

Oct. 9, 2003    (KR)    ...................... 10-2003-0070309

(51) Int. Cl.
*G06K 19/06*    (2006.01)
(52) U.S. Cl. ...................... 235/492; 235/451
(58) Field of Classification Search ................ 235/492, 235/451
See application file for complete search history.

(56) References Cited

U.S. PATENT DOCUMENTS

| | | | | |
|---|---|---|---|---|
| 4,575,621 A * | 3/1986 | Dreifus | ....................... | 235/380 |
| 5,787,101 A * | 7/1998 | Kelly | ....................... | 714/800 |
| 6,098,888 A | 8/2000 | Praden | ....................... | 235/492 |
| 6,247,644 B1 | 6/2001 | Horne et al. | ................. | 235/380 |
| 6,398,648 B1 * | 6/2002 | Takemoto et al. | ............ | 463/35 |
| 6,581,841 B1 * | 6/2003 | Christoffersen | ............. | 235/492 |
| 2001/0025882 A1 | 10/2001 | Coulier | ....................... | 235/380 |
| 2003/0089785 A1 * | 5/2003 | Tashiro | ....................... | 235/492 |
| 2003/0093609 A1 | 5/2003 | Drabczuk et al. | ........... | 710/315 |
| 2003/0183691 A1 | 10/2003 | Lahteenmaki et al. | ...... | 235/441 |
| 2004/0000593 A1 * | 1/2004 | Sekiya | ....................... | 235/492 |

FOREIGN PATENT DOCUMENTS

| | | |
|---|---|---|
| KR | 2002-085273 | 11/2002 |
| WO | WO 94/23399 | 10/1994 |
| WO | WO 03/032244 A1 | 4/2003 |

\* cited by examiner

*Primary Examiner*—Steven S. Paik
(74) *Attorney, Agent, or Firm*—F. Chau & Associates, LLC

(57) ABSTRACT

An integrated circuit card of the present disclosure is provided, which includes an input/output block for receiving external command data, a central processing unit for performing a task corresponding to the received command data, and a judgment block for judging whether a working time of the central processing unit reaches a reference time, after an input of the external command data is completed, where a control block operates responsive to an output of the judgment block and controls such that procedure data is output via the input/output block without intervention by the central processing unit whenever the working time of the central processing unit reaches the reference time.

28 Claims, 3 Drawing Sheets

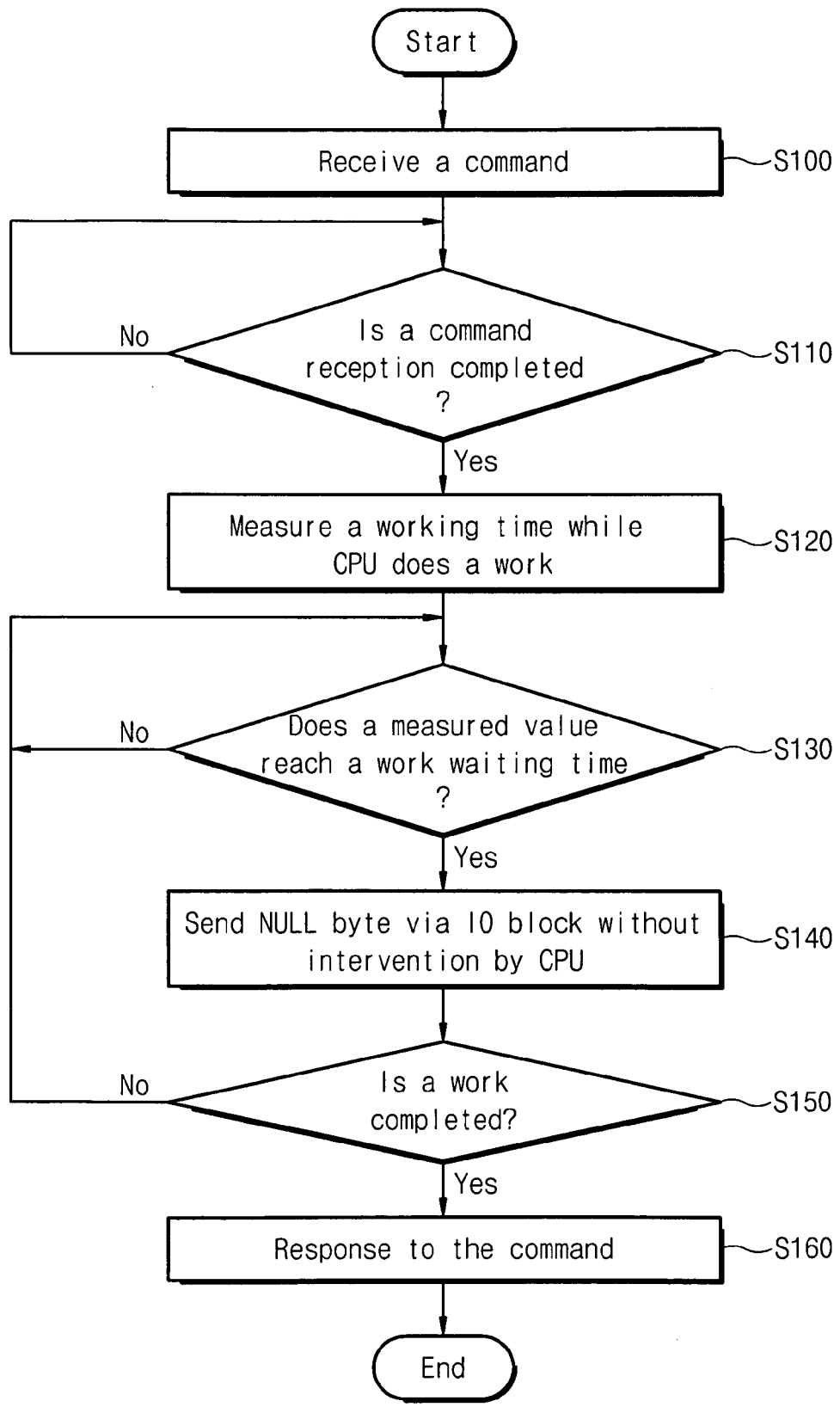

INTEGRATED CIRCUIT CARD CAPABLE OF AUTOMATICALLY TRANSMITTING NULL BYTE INFORMATION WITHOUT INTERVENTION BY CPU

FIELD OF THE INVENTION

The present invention is generally directed towards integrated circuit cards, and, more particularly, towards integrated devices that automatically transmit information within a work waiting time.

BACKGROUND OF THE INVENTION

A conventional plastic card, such as a magnetic card with a magnetic strip, cannot store a great amount of data and lacks security. In line with progress in semiconductor technology, the sizes of integrated circuits (ICs) are becoming increasingly small. For this reason, an IC card has been developed by the integration of a plastic card and an IC, and is used to completely replace the conventional magnetic card. Since an IC card can store much more data, has better security, and cannot be easily damaged, the IC card may not only function as a bank card, but also as an identification card and/or a health insurance card, for example. Thus, IC cards or smart cards are widely used.

An IC card is a card that transmits and receives data according to an interface defined in the ISO Standard 7816. For example, electronic signals and transmission protocols of the IC card are defined in ISO Standard 7816-3. With asynchronous half-duplex character transmission protocol as defined in the ISO Standard 7816-3, hereinafter referred to as "T=0 transmission protocol", if an interface device transmits a command to an IC card, the IC card must transmit a procedure byte to the interface device within a given time called "a work waiting time". Procedure bytes transmitted by the card comprise ACK, NULL, and SW1 bytes. In particular, the NULL byte is transmitted from the IC card to the interface device in order to gain an additional working time when a time needed to process the received command exceeds the work waiting time. The interface device resets a timer for measuring a work waiting time when the NULL byte is transmitted from the IC card, so that the work waiting time is reset.

In the case of the aforementioned T=0 transmission protocol, the IC card has to transmit the NULL byte to the interface device before the time taken to process the input command exceeds the work waiting time. This means that a central processing unit of a conventional IC card must stop executing the current input command in order to process a procedure for transmitting the NULL byte. As is well known, the IC card processes a command according to an application program. For this reason, the procedure for transmitting the NULL byte causes program overhead. In addition, in cases where it is impossible to stop execution of a current input command, the interface card does not receive a response from the IC card within the work waiting time and treats a current communication state as a communication error. Accordingly, normal communication between the interface device and the IC card is not completed.

SUMMARY OF THE INVENTION

Embodiments of the present disclosure provide an integrated circuit card capable of automatically transmitting NULL byte information without intervention by a CPU.

According to one aspect of the present disclosure, an integrated circuit card includes an input/output block for receiving external command data; a central processing unit for performing work corresponding to the received command data; a judgment block for judging whether a working time of the central processing unit reaches a reference time, after an input of the external command data is completed; and a control block for operating responsive to an output of the judgment block, wherein the control block controls such that procedure data (e.g., a NULL byte) is output via the input/output block without intervention by the central processing unit whenever the working time of the central processing unit reaches the reference time.

In an exemplary embodiment, the judgment block sets the input/output block to a transmission mode when the working time of the central processing unit reaches the reference time.

In an exemplary embodiment, the judgment block sets the input/output block to a reception mode when transmission of the procedure data is ended.

In an exemplary embodiment, the judgment block comprises: an oscillator circuit configured to generate a clock signal; a register configured to store the reference time; a counter configured to count in synchronization with the clock signal when an input of the command data is completed; and a comparator for judging whether a count time of the counter reaches the reference time. The counter is reset by an output of the comparator when the input of the command data is completed or when the count time of the counter reaches the reference time. The judgment block further comprises a switch circuit that transfers the clock signal to the counter when the input of the command data is completed.

BRIEF DESCRIPTION OF THE DRAWINGS

A more complete appreciation of the present invention, and many of the attendant advantages thereof, will become more readily apparent by reference to the following detailed description when considered in conjunction with the accompanying drawings, in which like reference symbols may indicate the same or similar components, wherein:

FIG. 3 is a flowchart for describing an operation of an exemplary embodiment integrated circuit card.

DETAILED DESCRIPTION OF PREFERRED EMBODIMENTS

Preferred embodiments of the present disclosure will be more fully described with reference to the attached drawings.

Figure 1:
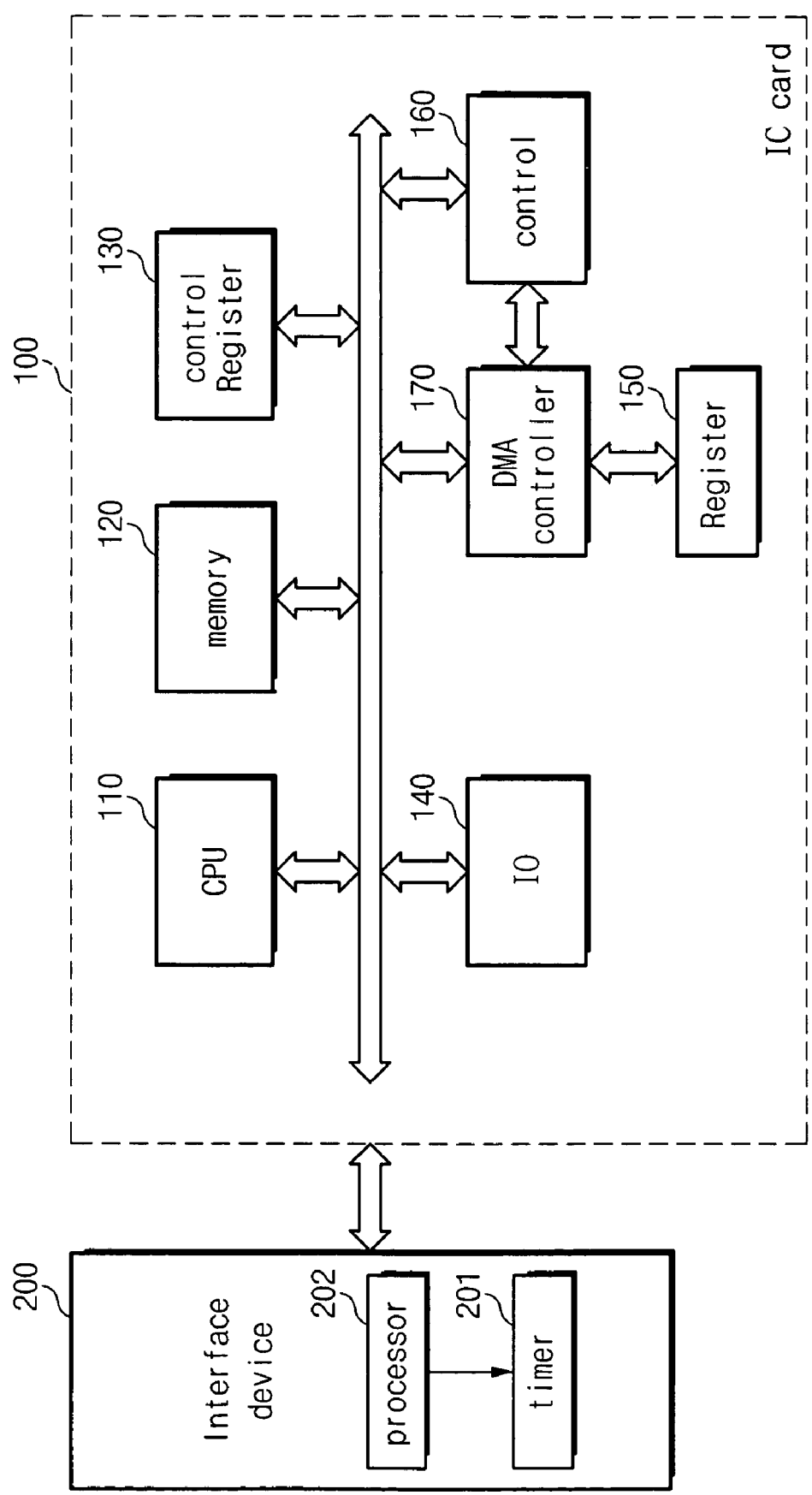
FIG. 1 is a schematic block diagram of an integrated circuit card according to an exemplary embodiment of the present disclosure.

FIG. 1 is a schematic block diagram of an integrated circuit card according to an exemplary embodiment of the present disclosure. An IC card 100 communicates with an interface device 200 according to the T=0 transmission protocol. The present IC card 100 automatically transmits a NULL byte to the interface device 200 without intervention by a central processing unit, before a time needed to process a command from the interface device 200 exceeds a work waiting time. The interface device 200 transmits a command to the IC card 100 and simultaneously measures a work waiting time using a timer 201. If a NULL byte is received within the work waiting time, a processor 202 of the interface device 200 resets the timer 201 and then starts to measure the work waiting time again.

The IC card 100 according to the present disclosure, as illustrated in FIG. 1, includes a central processing unit 110 (hereinafter, referred to as CPU), a memory 120 for storing application programs to be executed by the CPU 110, a control register 130, and an input/output block 140 for receiving and outputting data, which are well known to those skilled in the art. Thus, further description thereof is omitted.

Continuing with FIG. 1, the present IC card 100 further comprises a register 150, a control block 160, and a direct memory access (DMA) controller 170. The register 150 is configured to store a NULL byte. The register 150 can be configured to store other procedure bytes instead of the NULL byte. When an input of a command from the interface device 200 is completed, the control block 160 judges whether a time needed to process an input command reaches a reference time (that is, a work waiting time or a period shorter than the work waiting time). If the time reaches the work waiting time, the control block 160 outputs to the DMA controller 170 a signal (e.g., a flag signal) indicating that a work time of the CPU 110 reaches the reference time. The DMA controller 170 requests the right of gaining bus access to the CPU 110 in response to the signal from the control block 160. The DMA controller 170 outputs the NULL byte in the register 150 to the interface device 200 via the input/output block 140 when the right of gaining bus access is acquired.

Accordingly, the IC device or card 100 of the present disclosure automatically transmits a NULL byte to the interface device 200 without intervention by a central processing unit, before a time needed to process a command from the interface device 200 exceeds a work waiting time.

Figure 2:
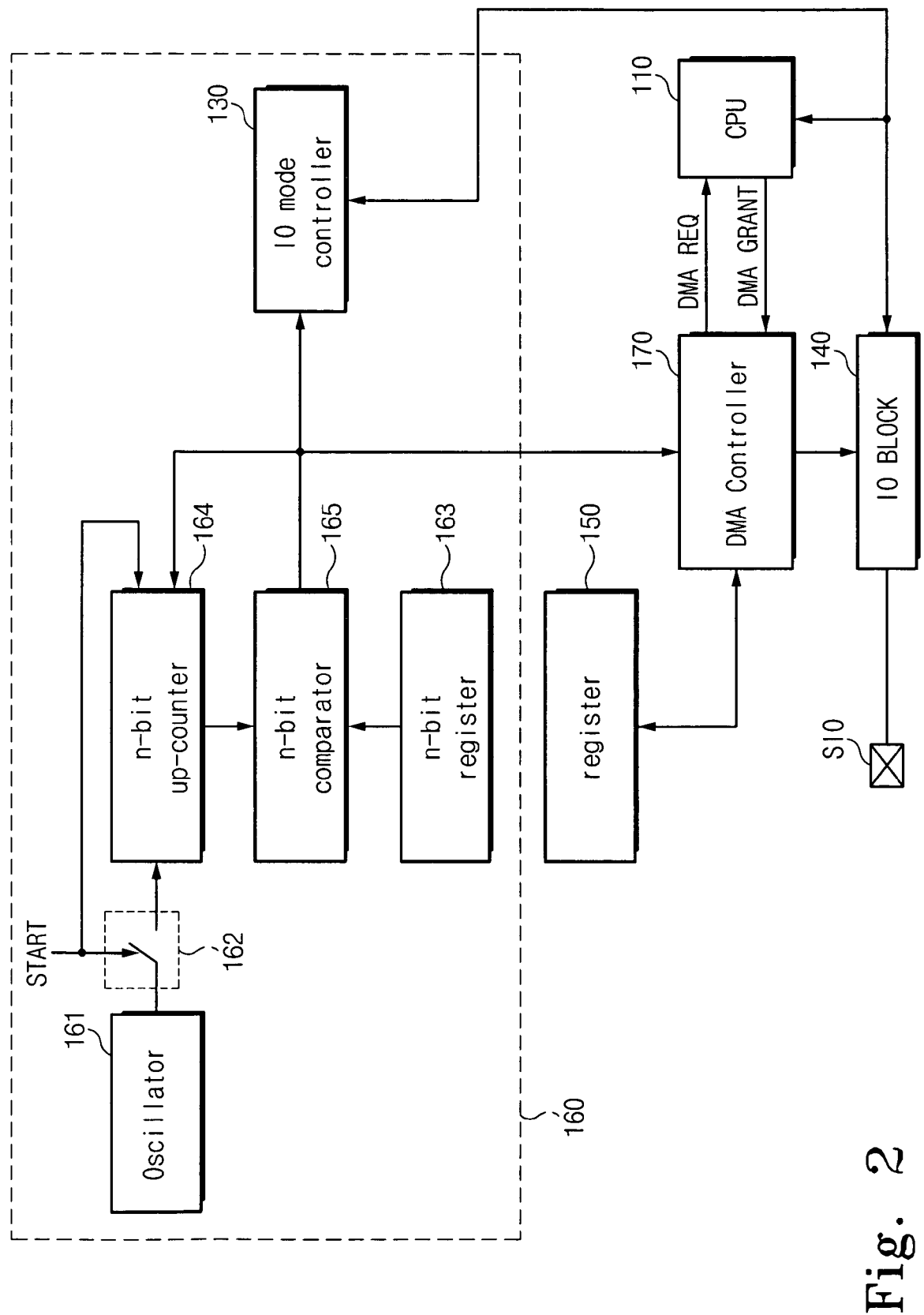
FIG. 2 is a schematic block diagram for a control block of FIG. 1 according to an exemplary embodiment of the present disclosure.

FIG. 2 is a schematic block diagram for a control block of FIG. 1 according to an exemplary embodiment of the present disclosure.

A control block 160 according to the present disclosure includes an oscillator 161, a switch 162, an N-bit register 163, an N-bit up-counter 164, an N-bit comparator 165, and an input/output mode controller 166. The oscillator 161 generates a clock signal of a given period. The period or frequency (e.g., 100 MHz) of the clock signal can be changed according to application requirements. The switch 162 transfers the clock signal from the oscillator 161 to the N-bit up-counter 164 in response to a control signal START. The control signal START is activated when an input of a command from the interface device 200 is ended, and inactivated when a transmission of a procedure byte associated with the input command is completed. The control signal START can be generated by use of a specific bit of the control register 130 of FIG. 1. For example, the CPU 110 may change a specific bit of the control register 130 so that the control signal START is activated when command reception is ended.

The N-bit register 163 is configured to store data indicative of the reference time (e.g., the same or shorter time period than a work waiting time). The N-bit up-counter 164 is reset by the control signal START, and counts in synchronization with a clock signal transferred via the switch 162. That is, the N-bit up-counter 164 counts from a point of time when the IC card 100 receives a command. The N-bit comparator 165 detects whether a count time of the counter 164 reaches the reference time stored in the N-bit register 163. When the count time of the counter 164 reaches the reference time, the N-bit up-counter 164 is reset by an output of the N-bit comparator 165. The input/output mode controller 166 controls a transmission/reception mode of the input/output block 140 in response to an output of the N-bit comparator 165.

FIG. 3 is a flowchart for describing an operation of an exemplary embodiment integrated circuit card. In accordance with ISO Standard 7816, when an interface device 200 transmits a command to an IC card 100, the IC card 100 processes a task corresponding to the input command and responds within a given time (i.e., a work waiting time). If the task is not completed within the work waiting time, the present IC card 100 transfers a NULL byte as a procedure byte to the interface device 200 in order to delay the work waiting time.

When a command from the interface device 200 is received via the input/output block 140 (S100), the CPU 110 of the IC card 100 judges whether the command input is completed by use of an application program stored in the memory 120 (S110). If so, the CPU 110 works according to the input command, and a work time of the CPU is simultaneously measured (S120). When the command input is completed, a specific bit of the control register 130 is set to a given value (e.g., 1) by the CPU 110, which makes the control signal START activated. As the control signal START is activated, the N-bit up-counter 164 is reset by the activated control signal START, and the switch 162 transfers a clock signal from the oscillator 161 to the N-bit up-counter 164. The N-bit up-counter 164 counts in synchronization with the clock signal from the oscillator 161.

The N-bit comparator 165 compares a count time (or a counted value) of the up-counter 164 with a reference time (or a reference time value) in the N-bit register 163 (S130). The comparator 165 judges whether the count time (or the counted value) of the up-counter 164 reaches the reference time (or the reference time value) in the N-bit register 163. If so, the DMA controller 163 transfers the NULL byte in the register 150 to the interface device 200 via the input/output block 140 (S140).

For example, when the count time (or the counted value) of the up-counter 164 reaches the reference time (or the reference time value) in the N-bit register 163, the input/output mode controller 166 sets the input/output block 140 to a transmission mode in response to an output of the comparator 165, and the DMA controller 170 requests the right of gaining bus access to the CPU 110. If the right of gaining bus access is acquired, the DMA controller 170 fetches the NULL byte from the register 150 and then transmits the NULL byte to the interface device 200 via the input/output block 140. The timer 201 in the interface device 200 is reset by the processor 202 therein when the NULL byte is received from the IC card 100. If transmission of the NULL byte to the interface device 200 is completed, the input/output block 140 is set to a reception mode by the input/output mode controller 166.

Afterward, whether a work executed by the CPU 110 is completed is judged (S150). If the work is not completed within the re-established work waiting time, the steps S130, S140, and S150 are repeated to delay the work waiting time. If the work of the CPU 110 is completed within the re-established work waiting time, the IC card 100 transmits a procedure byte associated with the input command to the interface device 200 (S160).

The IC card according to this exemplary embodiment of the present disclosure automatically performs an operation of transmitting a NULL byte whenever a command is received. But, the present IC card can selectively perform transmitting of the NULL byte considering a procedure time of an input command. For example, in a case of completing a task within a shorter time than the work waiting time, the CPU can set a specific bit in the register 150 so that transmitting of the NULL byte is not carried out. In a case of doing a task during a longer time than the work waiting time, as described above, the CPU can set a specific bit in the register 150 so that the transmitting of the NULL byte is automatically carried out.

The present invention has been described by way of example using exemplary and preferred embodiments. However, it is to be understood that the scope of the present invention is not limited to the disclosed embodiments. On the contrary, it is intended that the invention cover various modifications and similar arrangements. The scope of the claims, therefore, should be accorded the broadest interpretation so as to encompass all such modifications and similar arrangements.

What is claimed is:

1. An integrated circuit card comprising:
   an input/output block for receiving external command data;
   a central processing unit in signal communication with the input/output block for performing a task corresponding to the received command data;
   a judgment block in signal communication with the central processing unit for judging whether a working time of the central processing unit reaches a reference time, after an input of the external command data is completed; and
   a control block in signal communication with the judgment block for operating responsive to an output of the judgment block, wherein the control block controls such that procedure data is output via the input/output block without intervention by the central processing unit whenever the working time of the central processing unit reaches the reference time,
   the judgment block comprising:
   an oscillator circuit configured to generate a clock signal;
   a register in signal communication with the oscillator circuit, configured to store the reference time;
   a counter in signal communication with the register, configured to count in synchronization with the clock signal when an input of the command data is completed; and
   a comparator in signal communication with the counter, for judging whether a count time of the counter reaches the reference time.

2. The integrated circuit card of claim 1, wherein the judgment block sets the input/output block to a transmission mode when the working time of the central processing unit reaches the reference time.

3. The integrated circuit card of claim 1, wherein the judgment block sets the input/output block to a reception mode when transmission of the procedure data is ended.

4. The integrated circuit card of claim 1, wherein the procedure data comprises a NULL byte.

5. The integrated circuit card of claim 1, wherein the counter is reset by an output of the comparator when the input of the command data is completed or when the count time of the counter reaches the reference time.

6. The integrated circuit card of claim 1, the judgment block further comprising a switch circuit in signal communication with the counter that transfers the clock signal to the counter when the input of the command data is completed.

7. The integrated circuit card of claim 6, wherein the switch circuit stops transferring the clock signal to the counter when a response corresponding to the command data is issued.

8. The integrated circuit card of claim 1, wherein the reference time is a work waiting time defined in ISO Standard 7816 or a shorter time than the work waiting time.

9. An integrated circuit card comprising:
   a register configured to store NULL byte data;
   an input/output block in signal communication with the register for receiving command data from the outside;
   a central processing unit in signal communication with the input/output block for performing a work corresponding to the received command data;
   a judgment block in signal communication with the central processing unit for outputting a flag signal indicating whether a working time of the central processing unit reaches a reference time after an input of command data is completed; and
   a DMA controller in signal communication with the judgment block for operating responsive to the flag signal,
   wherein the DMA controller requests the right of gaining bus access to the central processing unit while fetching the NULL byte data from the register in response to the flag signal, and wherein the DMA controller enables the NULL byte data to be issued via the input/output block without intervention by the central processing unit when the right of gaining bus access is acquired.

10. The integrated circuit card of claim 9, wherein the judgment block sets the input/output block to a transmission mode when the working time of the central processing unit reaches the reference signal.

11. The integrated circuit card of claim 9, wherein the judgment block sets the input/output block to a reception mode when an output of the NULL byte data is completed.

12. The integrated circuit card of claim 10, the judgment block comprising:
    an oscillator circuit configured to generate a clock signal;
    a register in signal communication with the oscillator circuit configured to store the reference time;
    a counter in signal communication with the register configured to count in synchronization with the clock signal when an input of the command data is completed; and
    a comparator in signal communication with the counter for comparing a count time of the counter with the reference time to generate the flag signal.

13. The integrated circuit card of claim 12, wherein the counter is reset by an output of the comparator when the input of the command data is completed or when the count time of the counter reaches the reference time.

14. The integrated circuit card of claim 12, the judgment block further comprising a switch circuit that transfers the clock signal to the counter when the input of the command data is completed.

15. The integrated circuit card of claim 14, wherein the switch circuit stops transferring the clock signal to the counter when a response corresponding to the command data is issued.

16. The integrated circuit card of claim 14, the judgment block further comprising an input/output mode controller that sets the input/output block to a transmission mode in response to the flag signal and to a reception mode when transmission of the NULL byte data is ended.

17. The integrated circuit card of claim 14, wherein the reference time is a work waiting time defined in ISO Standard 7816 or a shorter time than the work waiting time.

18. An operation method of an integrated circuit device comprising the steps of:
   judging whether a reception of a command from an interface device is completed; and
   when a command reception is completed:
      measuring a working time of a central processing unit while the central processing unit performs a task;
      generating a clock signal indicative of the working time;
      storing a reference time;
      counting with a counter in synchronization with the clock signal;
      judging whether a measured time reaches the reference time by comparing a count of the counter indicative of the measured working time with the stored reference time; and
      when the measured time reaches the reference time, transmitting NULL byte information to the interface device without intervention by the central processing unit.

19. The method of claim 18, wherein the interface device resets a work waiting time in response to the NULL byte information from the integrated circuit card.

20. A card system comprising:
   an interface device having a timer for measuring a work waiting time; and
   an integrated circuit card for responding to a command from the interface device, wherein the integrated circuit card comprises;
   a register configured to store NULL byte data;
   an input/output block in signal communication with the register for receiving command data from the interface device;
   a central processing unit in signal communication with the input/output block for performing a work corresponding to the received command data;
   a judgment block in signal communication with the central processing unit for outputting a flag signal indicating whether a working time of the central processing unit reaches a reference time after an input of command data is completed; and
   a DMA controller in signal communication with the judgment block for operating responsive to the flag signal,
   wherein the DMA controller requests the right of gaining bus access to the central processing unit while fetching the NULL byte data from the register in response to the flag signal, and wherein the DMA controller enables the NULL byte data to be issued via the input/output block without intervention by the central processing unit when the right of gaining bus access is acquired.

21. The card system of claim 20, wherein the judgment block sets the input/output block to a transmission mode when the working time of the central processing unit reaches the reference signal.

22. The card system of claim 20, wherein the judgment block sets the input/output block to a reception mode when an output of the NULL byte data is completed.

23. The card system of claim 20, the judgment block comprising:
   an oscillator circuit configured to generate a clock signal;
   a register in signal communication with the oscillator circuit configured to store the reference time;
   a counter in signal communication with the register configured to count in synchronization with the clock signal when an input of the command data is completed; and
   a comparator in signal communication with the counter for comparing a count time of the counter with the reference time to generate the flag signal.

24. The card system of claim 23, wherein the counter is reset by an output of the comparator when the input of the command data is completed or when the count time of the counter reaches the reference time.

25. The card system of claim 23, the judgment block further comprising a switch circuit that transfers the clock signal to the counter when the input of the command data is completed.

26. The card system of claim 25, wherein the switch circuit stops transferring the clock signal to the counter when a response corresponding to the command data is issued.

27. The card system of claim 23, the judgment block further comprising an input/output mode controller that sets the input/output block to a transmission mode in response to the flag signal and to a reception mode when transmission of the NULL byte data is ended.

28. The card system of claim 20, wherein the reference time is a work waiting time defined in ISO Standard 7816 or a shorter time than the work waiting time.

* * * * *